US00RE47687E

(19) United States
(12) Reissued Patent
Umemura et al.

(10) Patent Number: US RE47,687 E
(45) Date of Reissued Patent: Nov. 5, 2019

(54) DAMPING SYSTEM FOR STEERING WHEEL

(71) Applicant: TOYODA GOSEI CO., LTD., Kiyosu-shi, Aichi-ken (JP)

(72) Inventors: Norio Umemura, Kiyosu (JP); Tsutomu Ishii, Kiyosu (JP); Kosuke Shigeta, Kiyosu (JP); Osamu Hirose, Kiyosu (JP)

(73) Assignee: TOYODA GOSEI CO., LTD., Aichi-pref. (JP)

(21) Appl. No.: 14/882,659

(22) Filed: Oct. 14, 2015

Related U.S. Patent Documents

Reissue of:
(64) Patent No.: 8,556,292
Issued: Oct. 15, 2013
Appl. No.: 13/614,621
Filed: Sep. 13, 2012

(30) Foreign Application Priority Data

Sep. 28, 2011 (JP) ..... 2011-212711

(51) Int. Cl.
*B62D 7/22* (2006.01)
*B60Q 5/00* (2006.01)
*B60R 21/203* (2006.01)

(52) U.S. Cl.
CPC ..... *B62D 7/222* (2013.01); *B60Q 5/003* (2013.01); *B60R 21/2037* (2013.01)

(58) Field of Classification Search
CPC ..... B62D 7/222; B60R 21/2037
USPC ..... 280/731; 267/141.4, 141.5; 200/61.55
See application file for complete search history.

(56) References Cited

U.S. PATENT DOCUMENTS 3,756,551 A * 9/1973 Bishop ..... F16F 1/3732 267/141.1
3,975,007 A * 8/1976 Chorkey ..... B60G 15/08 188/268
5,350,190 A * 9/1994 Szigethy ..... 280/728.2
5,636,858 A * 6/1997 Niederman ..... B60R 21/2035 280/728.2
5,876,024 A * 3/1999 Hain ..... B64C 1/18 244/119

(Continued)

FOREIGN PATENT DOCUMENTS

JP UM-H2-038275 3/1990
JP UM-H2-038275 U 3/1990
JP 2009-202859 A 9/2009

*Primary Examiner* — Russell D Stormer
(74) *Attorney, Agent, or Firm* — Posz Law Group, PLC

(57) ABSTRACT

A damping system includes: a fixed member; an airbag device including a back holder and disposed on a rear side of the fixed member; an elastic member mounted in a mounting hole of the back holder; and a horn switch mechanism including a support member supported on the fixed member on a front side of the back holder, and a slider disposed between the support member and the elastic member. The airbag device functions as a damper mass of a dynamic damper, and the elastic member functions as a spring thereof. The horn switch mechanism includes an extended portion extending forwards. An engaged portion is formed at a circumferential edge portion of the mounting hole to extend rearwards. The elastic member includes an engaging portion opened in a front surface thereof. The elastic member is sandwiched by the engaged portion fitted in the engaging portion and the extended portion.

13 Claims, 10 Drawing Sheets

(Amended)

(56) References Cited

U.S. PATENT DOCUMENTS

| | | | | |
|---|---|---|---|---|
| 6,394,434 | B2 * | 5/2002 | Wolf | F16F 1/3732 267/141 |
| 7,159,897 | B2 * | 1/2007 | Worrell et al. | 280/731 |
| 8,256,797 | B2 * | 9/2012 | Sakurai et al. | 280/731 |
| 8,342,567 | B2 * | 1/2013 | Sasaki et al. | 280/728.2 |
| 2009/0218739 | A1 | 9/2009 | Terada et al. | |
| 2010/0219621 | A1 * | 9/2010 | Sasaki et al. | 280/731 |
| 2012/0292895 | A1 * | 11/2012 | Schutz | 280/731 |
| 2013/0026741 | A1 * | 1/2013 | Onohara | 280/731 |

* cited by examiner

UP
DOWN
FRONT
REAR
(20)
15
21
21a
21b
21d
21e
21f
21g
21h
23
23a
23b
23c
23x
24
24a
24b
24c
24d
24g
25
25a
25b
26
X (Amended)
FIG. 9
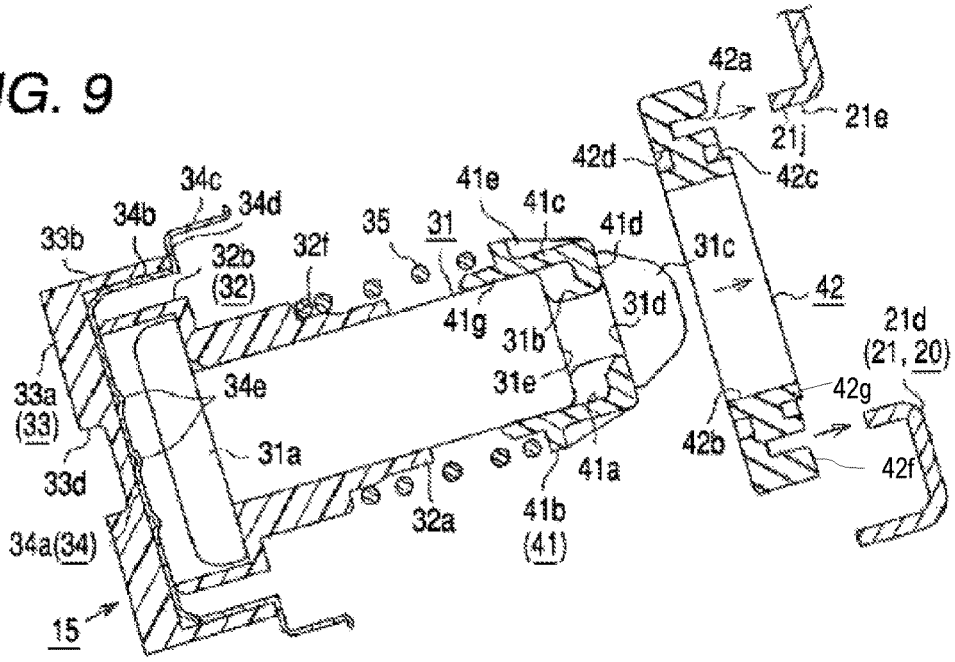
(Amended)

DAMPING SYSTEM FOR STEERING WHEEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

The present invention relates to a damping system for suppressing (controlling) vibrations of a steering wheel which incorporates an airbag device.

2. Background Art

When vibrations are transmitted to a steering wheel in a vertical direction and a horizontal direction while the vehicle is being driven at high speed or an in-vehicle engine is idling, the comfortable driving of the driver may be deteriorated. For this reason, techniques for suppressing (controlling) the vibrations of a steering wheel have been developed and proposed. One of the techniques employs a dynamic damper including a damper mass and an elastic member which supports the damper mass on a metallic core frame of the steering wheel. According to this technique, when vibrations of a frequency which is the same as or close to a resonance frequency specific to the dynamic damper are transmitted from the steering wheel to the dynamic damper, the dynamic damper resonates to absorb the vibration energy of the steering wheel. The vibration of the steering wheel is then suppressed (controlled) by the absorption of the vibration energy.

Recently, the steering wheel incorporates therein an airbag device so as to protect the driver from impact produced when the vehicle is involved in a collision. The airbag device includes an airbag and an inflator for supplying a gas to the airbag. When the vehicle is involved in a collision, the airbag is inflated to the rear by supplying the gas into the airbag, whereby the driver is protected from the impact produced upon collision.

The airbag device occupies most of an interior space defined within the steering wheel. Therefore, in recent steering wheels, it becomes difficult to incorporate the dynamic damper in the steering wheel.

Patent Document 1 describes a steering wheel in which an airbag device is made to double as a dynamic damper.

This steering wheel includes a holder, an airbag module, an elastic body and a horn switch. The holder is fixed to a steering shaft which extends in a front-right direction. The airbag device is configured by attaching an inflator and an airbag to a bracket individually and is disposed on a rear side of the holder. The elastic body is formed into a ring shape and is mounted in a mounting hole formed so as to penetrate the bracket in the front-rear direction. The horn switch includes an annular slider which is disposed between a support member and the elastic member, and a horn unit is activated by a forward movement of the slider which occurs in association with a pressing operation of the airbag device.

Patent Document 2 also describes a similar damping system.

According to the steering wheel, the airbag device functions as a damper mass of a dynamic damper, and the elastic member functions as a spring of the dynamic damper. When the steering wheel vibrates in directions such as vertical and horizontal directions perpendicular to the steering shaft with a predetermined frequency, the elastic member vibrates together with the airbag device in directions perpendicular to the steering shaft while the elastic member is deformed elastically with a resonance frequency which is the same or close to the predetermined frequency, whereby the vibration energy of the steering wheel is absorbed. Accordingly, the vibration of the steering wheel is suppressed (controlled) by the absorption of the vibration energy.

Patent Document 1: JP-A-2009-202859

Patent Document 2: JP-U-2-38275

SUMMARY

In Patent Document 1, since the elastic body is mounted in the mounting hole in the bracket, the elastic body has an outside diameter larger than a diameter of the mounting hole. Then, a circumferential edge portion of the circular mounting hole in the bracket is forced into the elastic body in a radially inward direction from an outer side of the elastic member, that is, in a direction perpendicular to the steering shaft from the outer side of the elastic body.

As the configuration described above, a considered configuration is that an annular groove is provided on an outer circumferential surface of an elastic body along a full circumference thereof, and a circumferential edge portion of a circular mounting hole in a bracket is fitted in the annular groove. In this case, in order that the elastic member having a larger outside diameter than the mounting hole is mounted in the mounting hole, the circumferential edge portion of the circular mounting hole has to be fitted in the annular groove while the elastic body is largely elastically deformed. Therefore, the mounting work of the elastic member in the mounting hole becomes complex and troublesome.

In addition, in the configuration, it becomes difficult to mount the elastic member in the mounting hole without a gap between an inner bottom surface of the annular groove and an inner wall surface of the circular mounting hole. When such a gap is produced, an airbag module and the elastic body do not vibrate as designed, which may not provide the intended vibration control effect. In particular, since the direction in which the circular mounting hole is fitted in the annular groove and the direction in which the damper mass (the airbag module) and the spring (the elastic body) of the dynamic damper vibrate to reduce vibrations are the same directions perpendicular to the steering shaft, the above-described problem with the gap is likely to be occur.

The problem can also occur similarly in Patent Document 2 having the configuration similar to that of Patent Document 1.

The invention has been made in view of these circumstances, and an object thereof is to provide a damping system for steering wheel which can mount an elastic member in a state of restricting the movement thereof by simple work.

In one aspect of the invention, a damping system for steering wheel, includes: a fixed member fixed to a steering shaft extending in a front-rear direction; an airbag device which includes a back holder provided at a front portion thereof and which is disposed on a rear side of the fixed member; an elastic member mounted in a mounting hole formed in the back holder so as to penetrate therethrough in a front-to-rear direction; and a horn switch mechanism including a support member supported on the fixed member at a position on a front side of the back holder, and a slider disposed between the support member and the elastic member so as to activate a horn unit by a forward movement of the slider associated with a pressing operation of the airbag device, wherein the damping system allows the airbag device to function as a damper mass of a dynamic damper, and allows the elastic member to function as a spring of the dynamic damper, wherein the horn switch mechanism further includes an extended portion extending forwards, wherein the back holder includes an engaged portion extending rearwards and formed at a circumferential edge portion of the mounting hole, wherein the elastic member includes an engaging portion including a recess portion opened in a front surface of the elastic member, and wherein the elastic member is sandwiched by the engaged portion fitted in the engaging portion and the extended portion in the front-rear direction.

In the damping system for steering wheel which is configured in the way described above, the airbag device functions as the damper mass of the dynamic damper, and the elastic member functions as the spring of the dynamic damper. Because of this, when the steering wheel vibrates with a predetermined frequency in a direction perpendicular to the steering shaft, the elastic member vibrates together with the airbag device in the direction perpendicular to the steering shaft (the airbag device and the elastic member resonate) so as to absorb the vibration energy of the steering shaft. By absorbing the vibration energy in this way, the vibration of the steering wheel is suppressed (controlled).

In addition, in the steering wheel, when the airbag device is pressed, the slider moves forwards on the support member which is supported on the fixed member, whereby the horn unit is activated.

In the steering wheel, when the horn switch mechanism is mounted on the back holder of the airbag device via the elastic member, mounting work of the horn switch mechanism on the elastic member and mounting work of the elastic member in the mounting hole are performed.

When performing the former work, the horn switch mechanism is disposed at the rear of the elastic member so that the extended portion extends forwards. By the horn switch mechanism being so disposed, the extended portion is caused to face a rear surface of the elastic member. In this state, the slider of the horn switch mechanism is inserted through the elastic member. In association with this insertion of the slider, the extended portion of the horn switch mechanism approaches the elastic member from a rear side thereof to thereby be brought into contact with the rear surface of the elastic member.

When performing the latter work, the elastic member is disposed so that the engaging portion is oriented to the front at the rear of the mounting hole in the back holder. By the elastic member being disposed in this way, the engaging portion of the elastic member is caused to face the engaged portion of the circumferential edge portion of the mounting hole. When the elastic member is caused to approach the mounting hole in this state, the engaged portion is fitted in the engaging portion.

In this way, the elastic member is sandwiched from front and rear thereof by the engaged portion and the extended portion. A movement of the elastic member in a direction which follows the steering shaft (the front-rear direction) is restricted by the engaged portion and the extended portion. Additionally, a movement of the elastic member in a direction perpendicular to the steering shaft is restricted by the engaged portion which is fitted in the engaging portion.

As a result, the airbag device and the elastic member are allowed to vibrate as designed while facilitating the mounting work of the elastic member, thereby making it possible to exhibit the vibration controlling effect.

In the damping system for steering wheel according to the above-described aspect, the elastic member may include a groove portion which is opened in at least one of the front surface and a rear surface of the elastic member.

According to the configuration described above, the groove portion which is opened in at least one of the front surface and the rear surface of the elastic member facilitates the elastic deformation of the elastic member. Because of this, when the steering wheel vibrates, the elastic member is allowed to resonate easily together with the airbag device, whereby it becomes easier to obtain the suppressing (controlling) effect of the vibration of the steering wheel.

In the damping system for steering wheel according to the above-described aspect, the groove portion may be formed between the engaging portion and the slider.

Here, when the steering wheel vibrates, it is considered that it is a portion between the engaging portion and the slider that is mainly deformed in an elastic fashion in the elastic member.

In the third aspect, by forming the groove portion between the engaging portion and the slider, the portion in relation to the elastic deformation is made to be elastically deformed more easily, whereby the effect provided in the second aspect can be obtained more easily.

According to the damping system for steering wheel of the aspects of the invention, the elastic member can be mounted while the movement thereof is restricted by performing the simple work.

BRIEF DESCRIPTION OF THE DRAWINGS

FIGS. 1A and 1B show an embodiment of the invention, in which FIG. 1A is a side view of a steering wheel and FIG. 1B is a view of the steering wheel as seen in a direction indicated by an arrow A.

FIG. 9 is a sectional view showing a state in which the horn switch mechanism shown in FIG. 8 is assembled to the back holder via an elastic member.

DETAILED DESCRIPTION

Figure 1A:
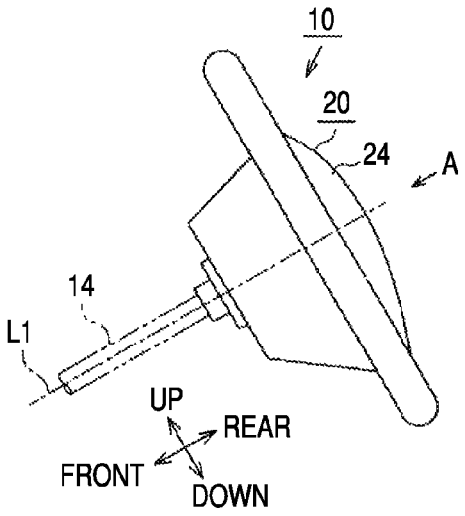

Hereinafter, referring to the drawings, an embodiment of the invention will be described in which the invention is embodied in a damping system for a steering wheel of a vehicle.

As shown in FIG. 1A, a steering shaft 14 which extends along an axis L1 in a front-rear and which rotates about the axis L1 is mounted in a position in a vehicle which lies further forwards (leftwards in FIG. 1A) than a driver's seat so as to be inclined so that an end (a right end in FIG. 1A) of the steering shaft which lies to face the driver's seat gets higher. A steering wheel 10 according to this embodiment is mounted at a rear end portion of the steering shaft 14 so as to rotate together with the steering shaft 14.

In this embodiment, when describing them, constituent portions of the steering wheel 10 will be described based on the axis L1 of the steering shaft 14. A direction which follows the axis L1 is referred to as a "front-rear," and in directions perpendicular to the axis L1, a direction in which the steering wheel 10 is erected is referred to as "vertical direction." Consequently, it follows that the front-rear direction and the vertical direction of the steering wheel 10 are slightly inclined relative to a front-rear (a horizontal direction) and a vertical direction (a perpendicular direction) of the vehicle.

Figure 12:
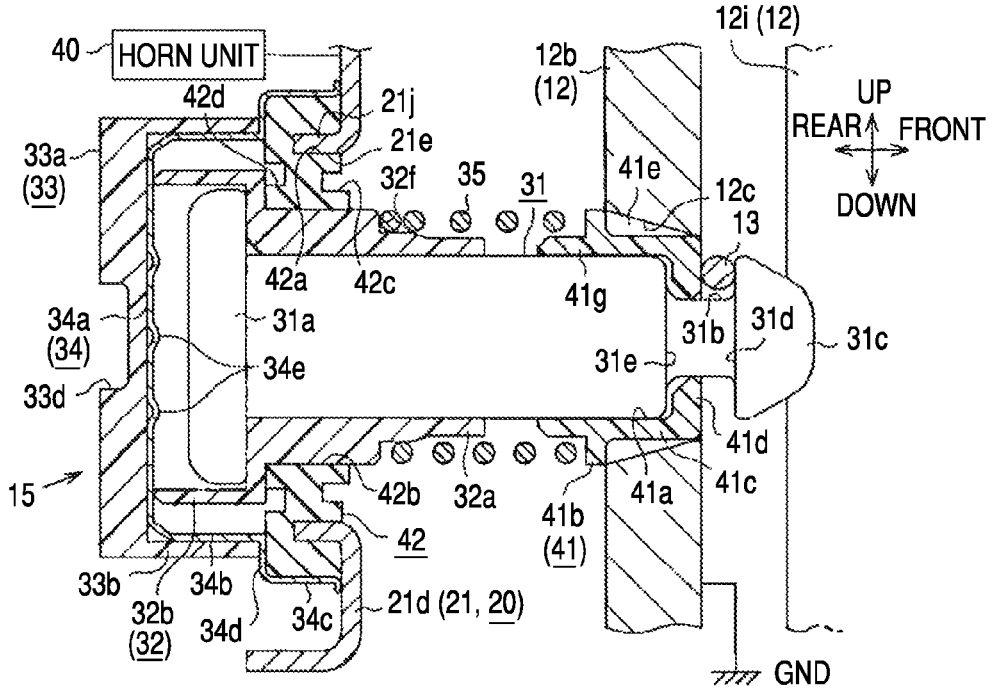
FIG. 12 is a partially sectional view showing an internal structure of the horn switch mechanism which is mounted on the metallic core frame.
Figure 13:
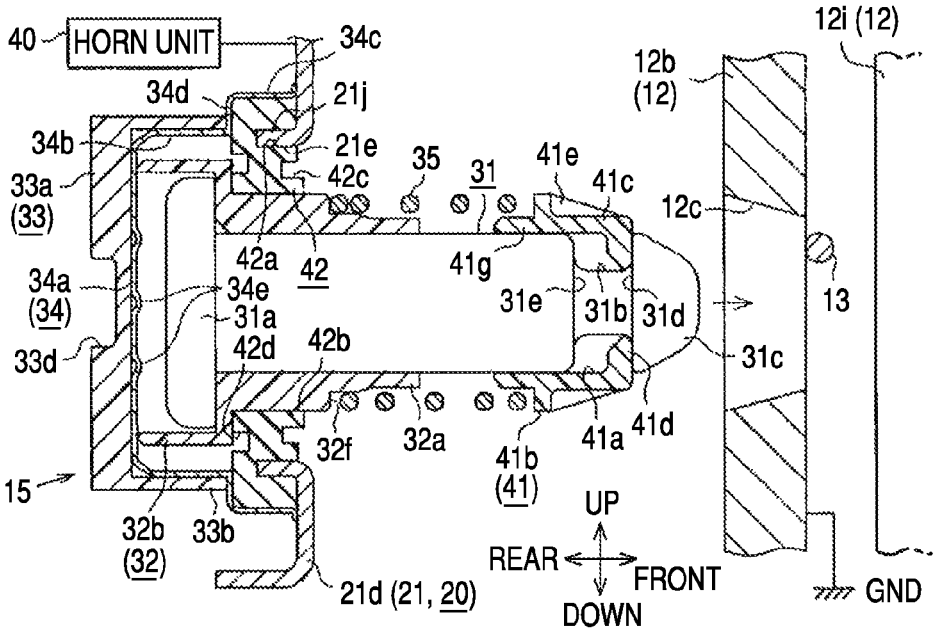
FIG. 13 is a partially sectional view showing an internal structure of the horn switch mechanism before it is mounted on the metallic core frame.
Figure 14:
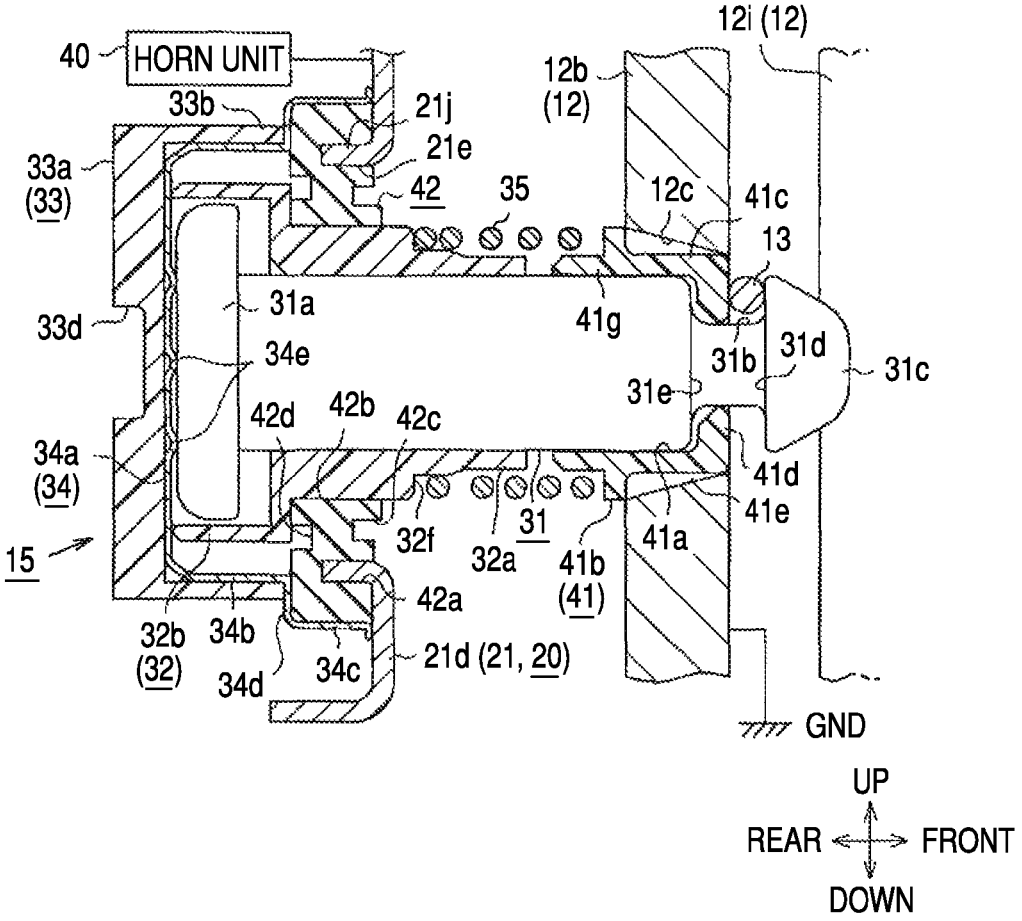
FIG. 14 is a partially sectional view showing an internal state of the horn switch mechanism resulting when the airbag device is pressed.

It should be noted that in FIGS. 12 to 14, as a matter of convenience, the front-rear direction of the steering wheel 10 is shown as coinciding with the horizontal direction and the vertical direction of the steering wheel 10 is shown as coinciding with the perpendicular direction.

Figure 1B:
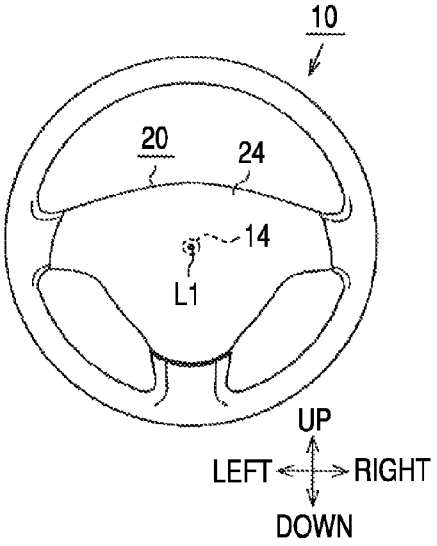
Figure 2:
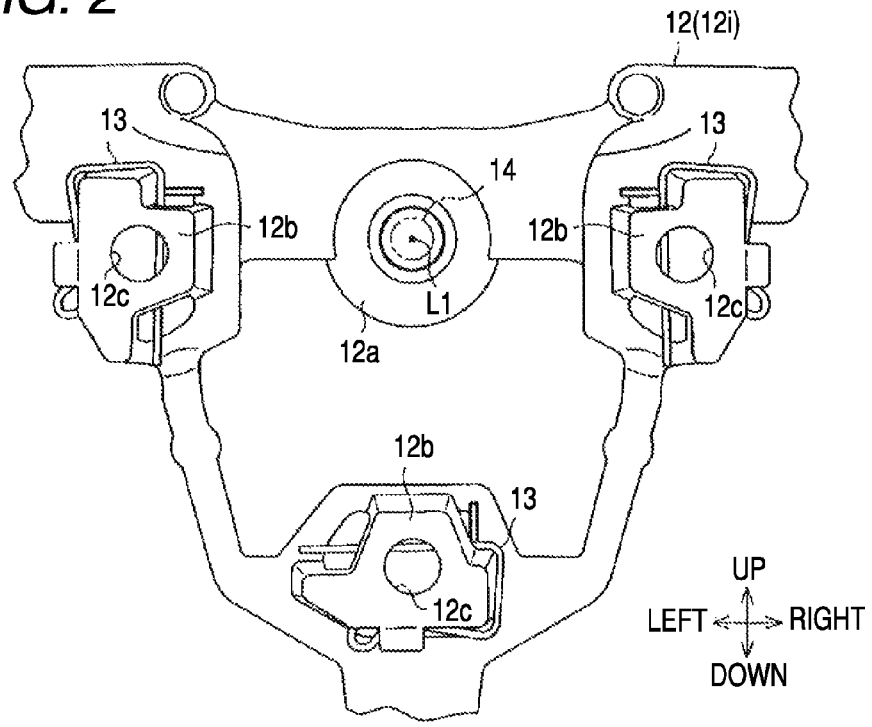
FIG. 2 is a partial front view of a metallic core frame of the steering wheel.

As shown in FIG. 1B, the steering wheel 10 includes an airbag device (an airbag module) 20 in a central portion thereof. A frame portion of the steering wheel 10 is made up of a metallic core frame 12 as a fixed member. FIG. 2 shows part of the metallic core frame 12. The metallic core frame 12 is formed of iron, aluminum, magnesium or alloys thereof. The metallic core frame 12 is fixed to the steering shaft 14 at a boss portion 12a which is positioned at a central portion thereof and rotates together with the steering shaft 14.

In the metallic core frame 12, holding portions 12b having a through hole 12c are provided at a plurality of locations (three locations in this embodiment) along the periphery of the boss portion 12. In the metallic core flame 12, when it is necessary to distinguish the holding portions 12b from the remaining portion, the latter portion will be referred to as a metallic core frame main body 12i. As shown in FIG. 13, an inner wall surface of each through hole 12c is tapered so that an opening defined by the inner wall is expanded diametrically as the through hole 12c extends towards the rear (the left as seen in FIG. 13). In FIG. 2, the illustration of this tapered inner circumferential surface is omitted.

As shown in FIGS. 2 and 13, a clip 13 is built in between each holding portion 12b and the metallic core frame main body 12i and near the through hole 12c. Each clip 13 is formed by bending a wire material made of a metal such as a spring steel into a predetermined shape and is built in between the holding portion 12b and the metallic core frame main body 12i while being slightly deformed in an elastic fashion so as to be held onto the metallic core frame 12. The clip 13 is brought into contact with at least one of the holding portion 12b and the metallic core frame main body 12i at part or an end portion thereof, for example. The clip 13 has a function to lock a fixing pin 31 of a horn switch mechanism 15, which will be described later, relative to the metallic core frame 12 while establishing an electric communication therebetween. Part of each clip 13 is positioned near the front of the through hole 12c.

A horn unit 40 (refer to FIG. 13) is provided in the vehicle, and a plurality of (three in this embodiment) horn switch mechanisms 15 are mounted individually in the holding portions 12b using a snap-in fitting structure so as to activate the horn unit 40. The respective horn switch mechanisms 15 have the same configuration. Then, the airbag device 20 is supported on the metallic core frame 12 via these horn switch mechanisms 15, in this way, each born switch mechanism 15 doubles as a support for the airbag device 20 in addition to its function as the horn switch.

Further, in this embodiment, an elastic member 42 is interposed between the airbag device 20 and each horn switch mechanism 15, and a damping system for suppressing (controlling) vibrations of the steering wheel 10 is made up of the airbag device 20 and the elastic members 42.

Next, the airbag device 20, each horn switch mechanism 15 and each elastic member 42 will be described individually.

<Airbag Device 20>

Figure 3:
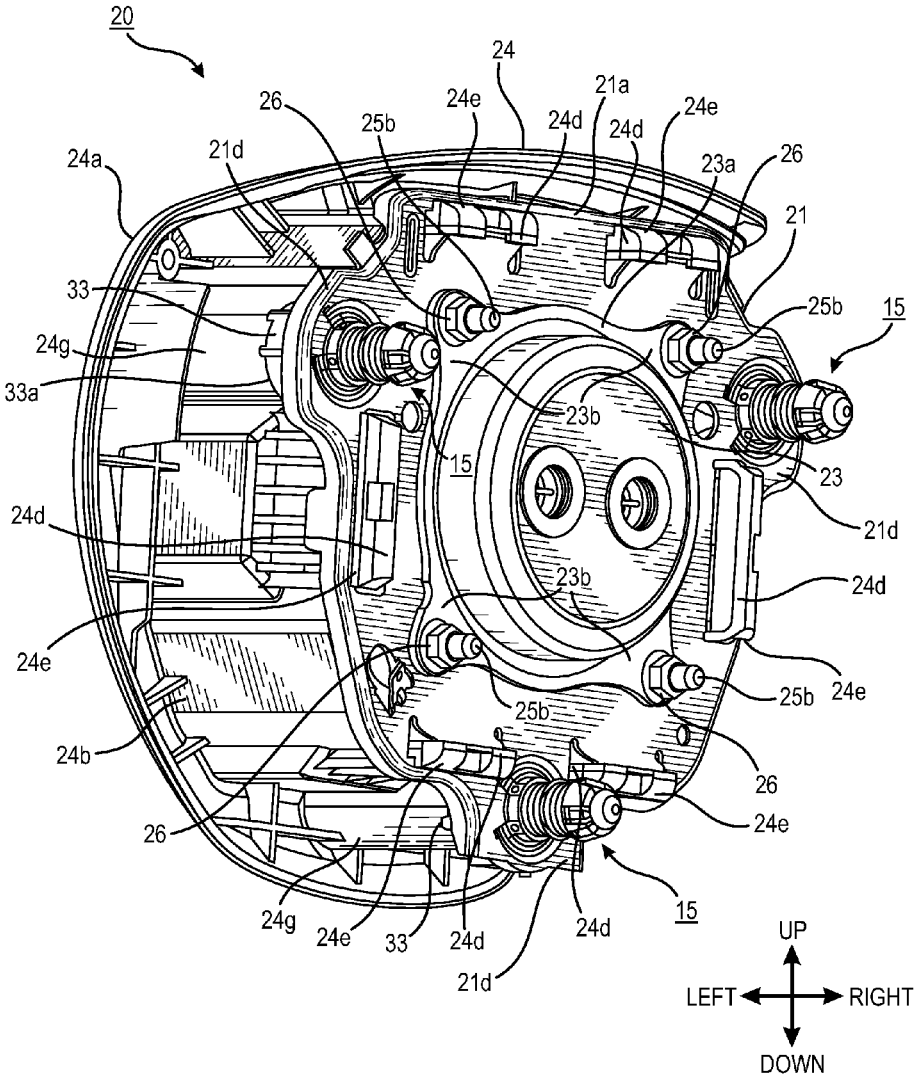
FIG. 3 is a perspective view of an airbag device showing a state of the airbag device as seen from a back side of the airbag device (a front side of the vehicle).
Figure 4:
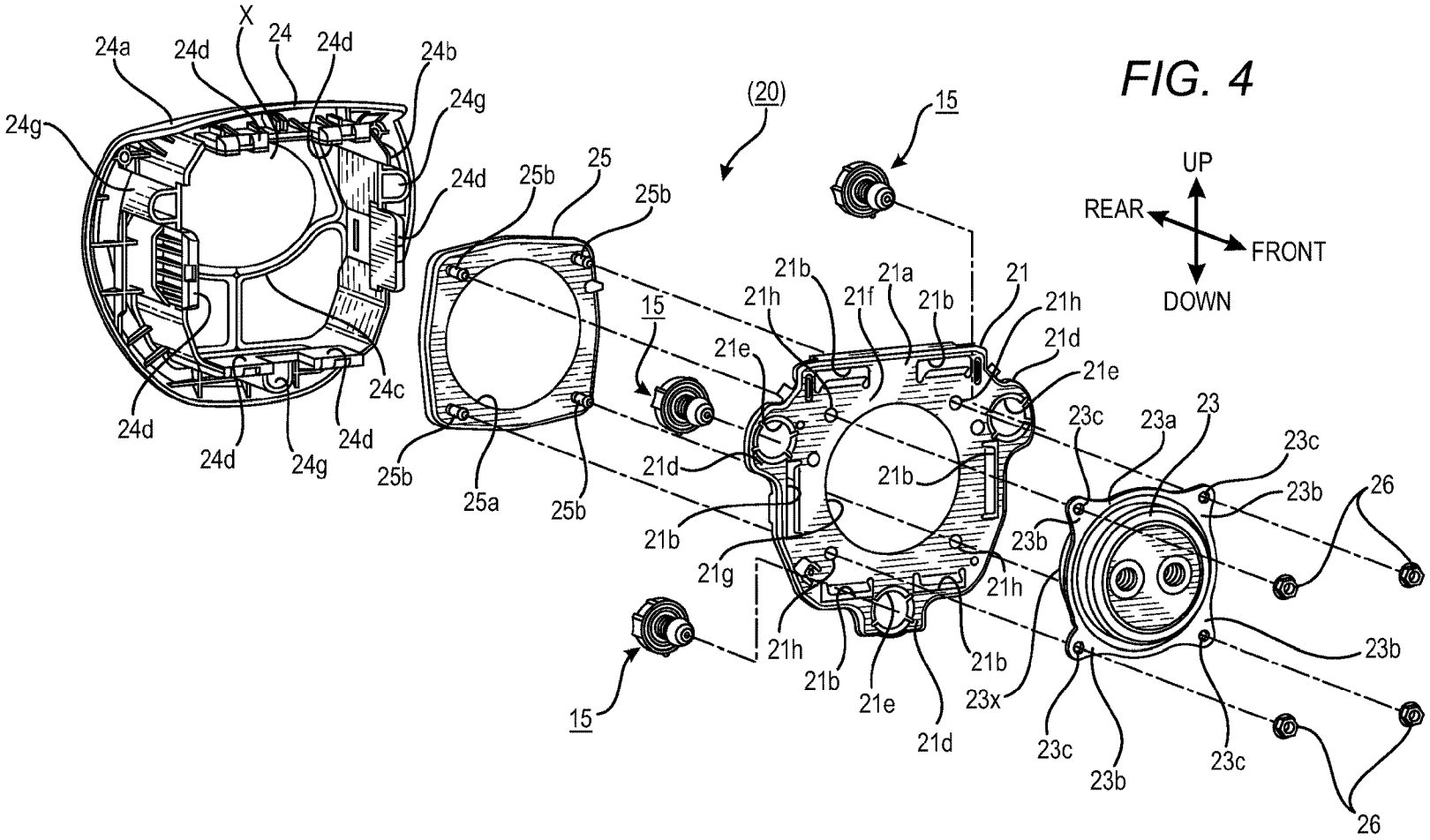
FIG. 4 is an exploded perspective view showing a state in which respective constituent components of the airbag device are seen from the back side (the front side of the vehicle).

As has been described above, the airbag device 20 is part of the damping system of the steering wheel 10 and is, as shown in FIGS. 3 and 4, made up by assembling a pad portion 24, an airbag (not shown) and an inflator 23 to a back holder 21 which is disposed at a front portion of the airbag device 20. This airbag device 20 is disposed at a rear side of the metallic core frame 12.

The pad portion 24 is made through resin molding and has a skin portion 24a whose surface is finished into a designed surface, an accommodation wall portion 24b which is erected into a substantially quadrangular ring shape on a rear surface side (a front side: a right-hand side as seen in FIGS. 3 and 4) of the skin portion 24a. An inner surface of the skin portion 24a which is surrounded by the accommodation wall portion 24b defines a bag accommodation space X (refer to FIG. 4) for accommodating mainly the airbag (not shown) between the back holder 21 and itself. A thin portion 24c, which is adapted to be pushed to be broken when the air bag is deployed and inflated, is formed at a portion of the skin portion 24a where the bag accommodation space X is defined.

A plurality of (six) locking claws 24d having a rectangular plate-like shape are formed integrally at a front end portion (a right end portion in FIG. 4) of the accommodation wall portion 24b. Each locking claw 24d is formed wide with a predetermined length, and a locking projection 24e (refer to FIG. 3) which projects outwards (a side which lies farther from the bag accommodation space X) is formed at a front end portion of each locking claw 24d.

Switch supporting portions 24g, which are adapted to support the corresponding horn switch mechanisms 15, are formed individually at a plurality of locations (three locations) on the pad portion 24. Each switch supporting portion 24g is formed integrally with the accommodation wall portion 24b so as to extend from the skin portion 24a of the pad portion 24 towards the rear surface side (the front side).

As shown in FIGS. 3, 4, 6 and 7, the back holder 21 is formed into a substantially rectangular shape by pressing a metal plate. Additionally, the back holder 21 may be formed through die casting. A circumferential edge portion of the back holder 21 is configured into a substantially quadrangular ring-shaped circumferential edge fixing portion 21a to which the pad portion 24 is fixed.

Claw locking holes 21b are formed individually in the circumferential edge fixing portion 21a at locations (front locations) which correspond to the clocking claws 24d of the pad portion 24. Each claw locking hole 21b is formed into a slit which is elongated in a direction which follows a side of the back holder 21 so as to correspond to each wide locking claw 24d. A front end portion of each locking claw 24d is inserted through each claw locking hole 21b so as to be locked therein.

An internal portion defined within the circumferential edge fixing portion 21a makes up a substantially square seat portion 21f. A circular opening portion 21g is formed in a central portion of the seat portion 21f. Screw insertion holes 21h are formed in the seat portion 21f at a plurality of locations near a circumferential edge portion of the opening portion 21g, here, at locations, four in total, which are located on diagonals of the seat portion 21f. The inflator 23 is mounted on the seat portion 21f with part thereof inserted through the opening portion 21g in the seat portion 21f.

More specifically, the inflator 23 has low cylindrical main body, and a flange portion 23a is formed on an outer circumferential surface of the main body. A plurality of (or four) mounting pieces 23b are formed on the flange portion 23a at equal angular intervals in a circumferential direction of the main body so as to extend radially outwards of the main body. In each mounting piece 23b, a screw insertion hole 23c is formed at a location (a front location) which corresponds to the screw through hole 21h in the back holder 21, in the inflator 23, a portion which lies further rearwards than the flange portion 23a is configured as a gas injection portion 23x (refer to FIG. 4) from which an inflation gas is injected. Then, the gas injection portion 23x of the inflator 23 is inserted through the opening portion 21g in the back holder 21 from the front side so as to project towards the bag accommodation space X side. Further, the flange portion 23a is brought into abutment with the circumferential edge portion of the opening portion 21g, and in this state, the inflator 23 is mounted on the back holder 21 together with a ring retainer 25 (refer to FIG. 4).

To describe in greater detail, the ring retainer 25 has a circular opening portion 25a which is similar to the opening portion 21g in the back holder 21 through which the gas injection portion 23x of the inflator 23 is inserted. Additionally, the ring retainer 25 has mounting screws 25b at a plurality of locations (four locations) which correspond to the screw through holes 21h in the back holder 21. An opening portion of an airbag (not shown) which is folded so as to be deployed and inflated is disposed between the ring retainer 25 and the back holder 21. The plurality of mounting screws 25b of the ring retainer 25 are inserted through screw insertion holes which are provided in a circumferential edge portion of the opening portion of the airbag and the screw insertion holes 21h, 23c of the back holder 21 and the inflator 23, respectively, from the rear side. Further, nuts 26 are screwed on the mounting screws 25b that have been inserted through the respective screw insertion holes from the front side, whereby the airbag is fixed to the back holder 21 via the ring retainer 25, and the inflator 23 is fixed to the back holder 21.

Mounting portions 21d in which the horn switch mechanisms 15 are mounted are formed at a plurality of locations (three locations) along the circumferential edge fixing portion 21a of the back holder 21 so as to project individually radially outwards of the circular opening portion 21g. The respective mounting portions 21d are situated at locations (front locations) which correspond to the switch supporting portions 24g of the pad portion 24. A mounting hole 21e in which the horn switch mechanism 15 is mounted is formed in each mounting portion 21d circularly and so as to penetrate the mounting portion 21d. A plurality of engaged portions 21j which extends rearwards individually are formed integrally on a circumferential edge portion of each mounting hole 21e in the back holder 21 (refer to FIG. 9). In this embodiment, each engaged portion 21j is formed by bending the circumferential edge portion of each mounting hole 21e in the back holder 21.

<Horn Switch Mechanism 15>

The horn switch mechanisms 15 are such as to activate the horn unit 40 as has been described above, and three horn switch mechanisms 15 are used in this embodiment. It is desired that the horn switch mechanisms 15 are set individually equidistant from the center (the boss portion 12a) of the steering wheel 10. This is because a contact terminal 34 and a collar portion 31a of a fixing pin 31, which will both be described later, are brought into contact with each other in an ensured fashion to produce an electrically communicating state therebetween.

Figure 5A:
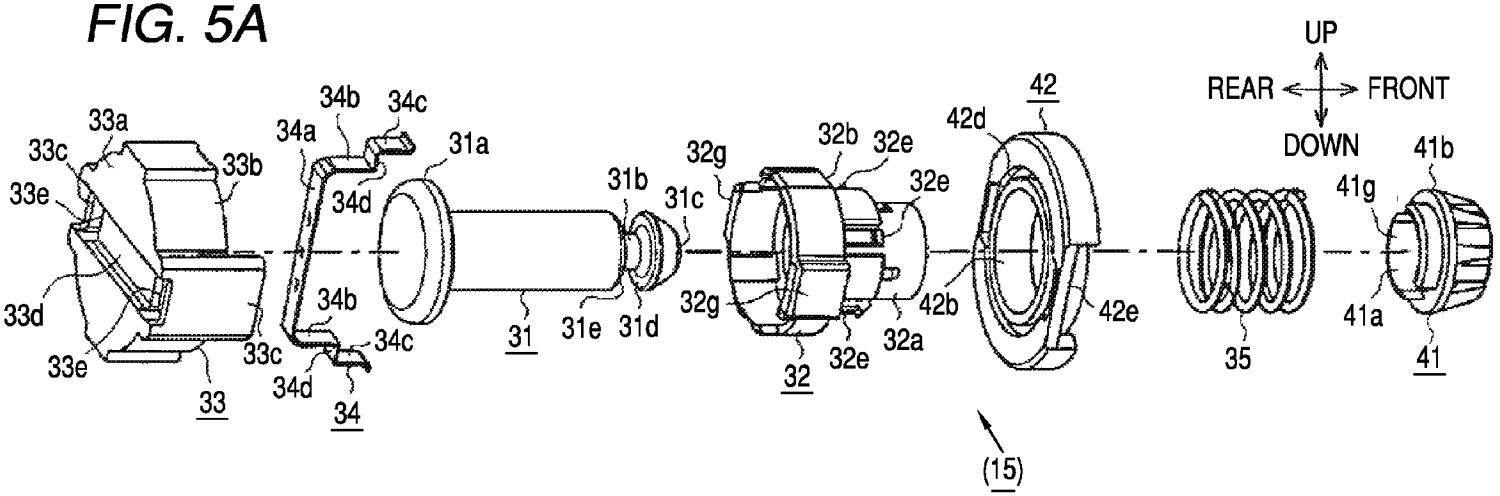
FIG. 5A shows an exploded perspective view of a horn switch mechanism.

As shown in FIG. 5A, each horn switching mechanism 15 includes a metallic fixing pin 31 which functions as a support member and a fixed side contact portion, a movable mount member 32 as a slider, a cap member 33 made of a resin, a contact terminal 34 as a movable side contact portion, a resin member 41 and a coil spring 35 as a biasing member. Next, the respective constituent members of the horn switch mechanism 15 will be described.

The fixing pin 31 is a member that is supported on the metallic core frame 12 in a position on a front side of the back holder 21. A supporting structure will be described later in which the fixing pin 31 is supported on the metallic core frame 12. The fixing pin 31 has a long shape and extends in the front-rear direction, and a recess portion is provided on an outer circumferential surface of a front end portion (a right end portion in FIG. 5A). In this embodiment, as the recess portion, an annular locking groove 31b is formed along the full circumference of the fixing pin 31. Most of the fixing pin 31 excluding a rear end portion is formed slightly smaller in diameter than the mounting hole 21e (refer to FIG. 4) in the back holder 21. A [collar portion 31a which is larger in diameter than the mounting hole 21e is formed at the rear end portion of the fixing pin 31] *diameter of the collar portion 31a of each pin 31 is set to be larger than a diameter of the corresponding shaft portion of the pin 31.* The collar portion 31a is a portion which functions as the fixed side contact portion.

The movable mount member 32 is formed of a material having a characteristic as an insulator, for example, a resin material. This movable mount member 32 has a stepped cylindrical shape and is disposed between the fixing pin 31 and the elastic member 42, which will be described later. In activating the horn switch mechanism 15, the movable mount member 32 is used as a slider which slides in the longitudinal direction (the front-rear direction). In the movable mount member 32, a fitting portion 32b into which the collar portion 31a of the fixing pin 31 is fitted is formed at a rear end of a portion through which the fixing pin 31 is inserted (hereinafter, referred to as a "cylindrical portion 32a"). The fitting portion 32b is brought into abutment with a front surface and an outer circumferential surface of the collar portion 31a of the fixing pin 31 on an inner circumferential surface thereof. Additionally, projecting abutment portions 32g are provided at two locations on the fitting portion 32b which face each other in a diametrical direction so as to project in a radial direction.

Figure 11:
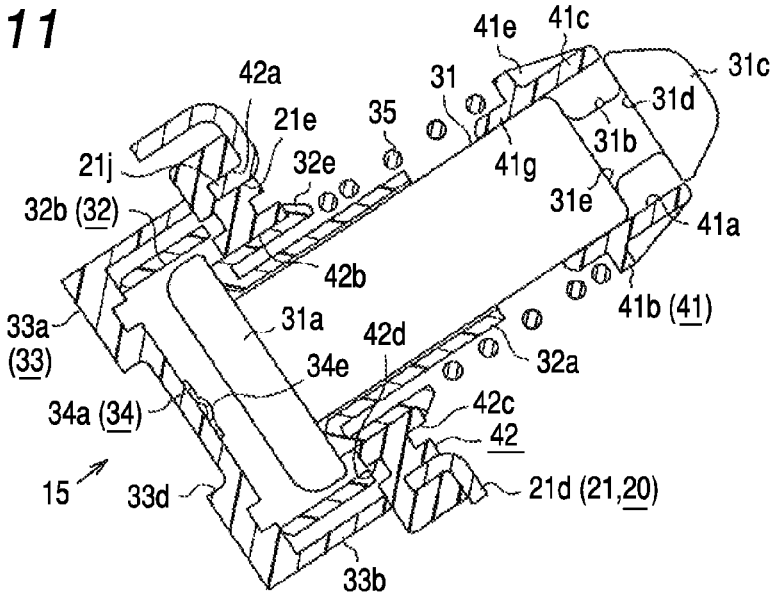
FIG. 11 is an enlarged sectional view taken along the line ZZ in FIG. 7.

As shown in FIG. 5A and FIG. 11, locking portions 32e extend forwards from a plurality of locations (four locations) along a circumferential direction on a front surface of the fitting portion 32b. A gap is set between each locking portion 32e and the cylindrical portion 32a (refer to FIG. 11), and each locking portion 32e can deflect in the radial direction.

Figure 8:
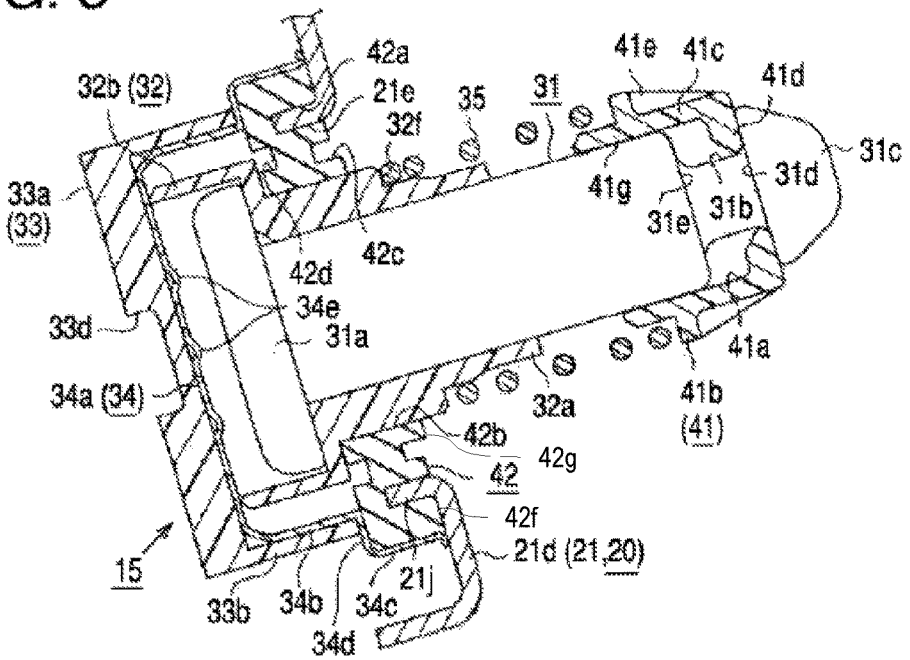
FIG. 8 is an enlarged sectional view taken along the line XX in FIG. 6.
Figure 10:
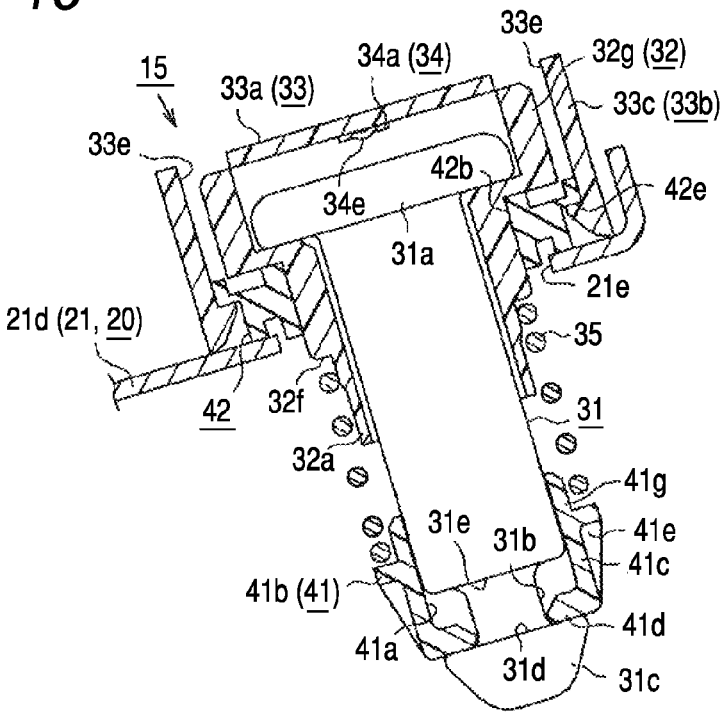
FIG. 10 is an enlarged sectional view taken along the line Y-Y in FIG. 6.

As shown in FIG. 5A and FIG. 8, the cap member 33 has a bottomed cylindrical shape which is opened at a front surface and is assembled to the fitting portion 32b of the movable mount member 32 so as to cover the fixing pin 31 and the movable mount member 32 from the rear. The cap member 33 has a substantially circular top plate portion 33a and a substantially cylindrical side wall portion 33b which extends forwards from an outer circumferential edge of the top plate portion 33a. Here, the side wall portion 33b makes up part of the horn switch mechanism 15 and is used as an extended portion which is extended to the front. As shown in FIG. 5A and FIG. 10, a pair of hook portions 33c are formed at two locations on the side wail portion 33b which face each other in the diametrical direction so as to be deformed elastically in the radial direction.

As shown in FIG. 5A and FIG. 8, a groove 33d is formed at a rear portion of the top plate portion 33a so as to align the orientation of the cap member 33 when the cap member 33 is assembled to the fixing pin 31 and the movable mount member 32. As shown in FIG. 5A and FIG. 10, forming holes 33e which form undercut portions of the hook portions 33c are formed in the groove 33d in positions which correspond to the hook portions 33c. Then, the forming holes 33e are dosed by the projecting abutment portions 32g on the movable mount member 32 which is brought into abutment with the top plate portion 33a of the cap member 33. Because of this, the intrusion of foreign matters such as dust into an interior of the cap member 33 from the respective forming holes 33e is prevented, whereby a problem with electrical communication between the fixing pin 31 and the contact terminal 34 is suppressed from being caused.

As shown in FIG. 5A and FIG. 8, the contact terminal 34 is formed by pressing a metallic plate. The contact terminal 34 includes an elongated main body portion 34a which extends in the diametrical direction of the cap member 33, a pair of first side portions 34b which extends forwards from both ends of the main body portion 34a, and a pair of second side portions 34c which are disposed further radially outwards and forwards of the cap member 33 than both the first side portions 34b and which are connected to front end portions of the first side portions 34b by connecting portions 34d.

The main body portion 34a is brought into contact with a front surface of the top plate portion 33a, and each first side portion 34b is brought into contact with an inner wall surface of the side wall portion 33b of the cap member 33. Each connecting portion 34d is brought into contact with a front end face of the side wall portion 33b, and each second side portion 34c is situated further radially outwards than the side wail portion 33b.

A plurality of (three in this embodiment) projecting contact portions 34e which project forwards are formed on the main body portion 34a at equal intervals along a longitudinal direction of the main body portion 34a.

Additionally, the fitting portion 32b of the movable mount member 32 is interposed between each first side portion 34b and the collar portion 31a of the fixing pin 31 so as to ensure an insulation state between each first side portion 34b and the collar portion 31a. In addition, the cylindrical portion 32a of the movable mount member 32 and the elastic member 42 are interposed between each second side portion 34c and the fixing pin 31 so as to ensure an insulation state between each second side portion 34c and the fixing pin 31.

Figure 5B:
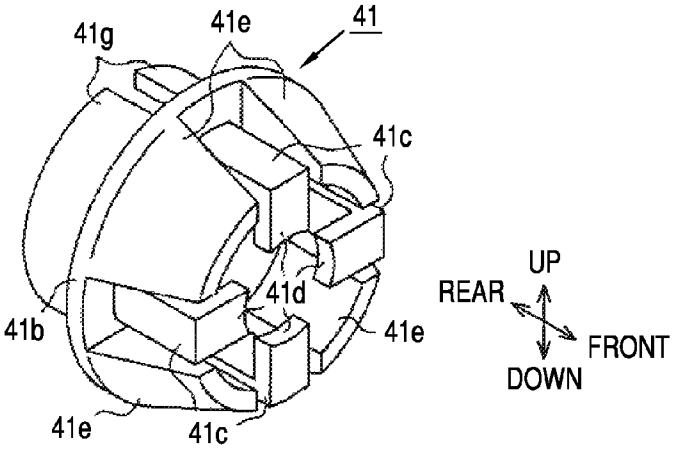
FIG. 5B is a perspective view of a resin member showing a state in which the resin member is seen from the front side.
Figure 6:
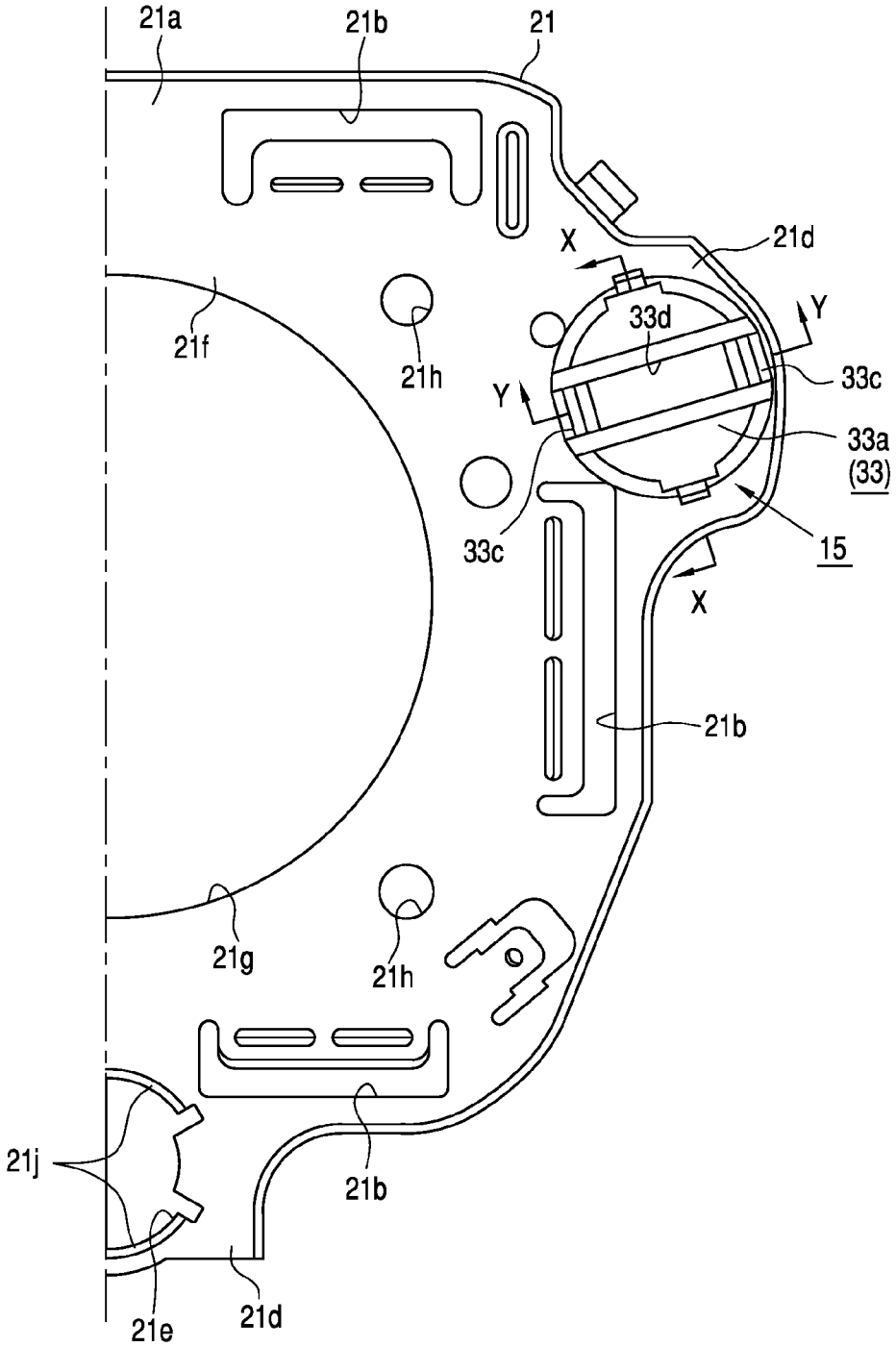
FIG. 6 is a partial front view showing a state in which the horn switch mechanism is assembled in one of mounting holes in a back holder.
Figure 7:
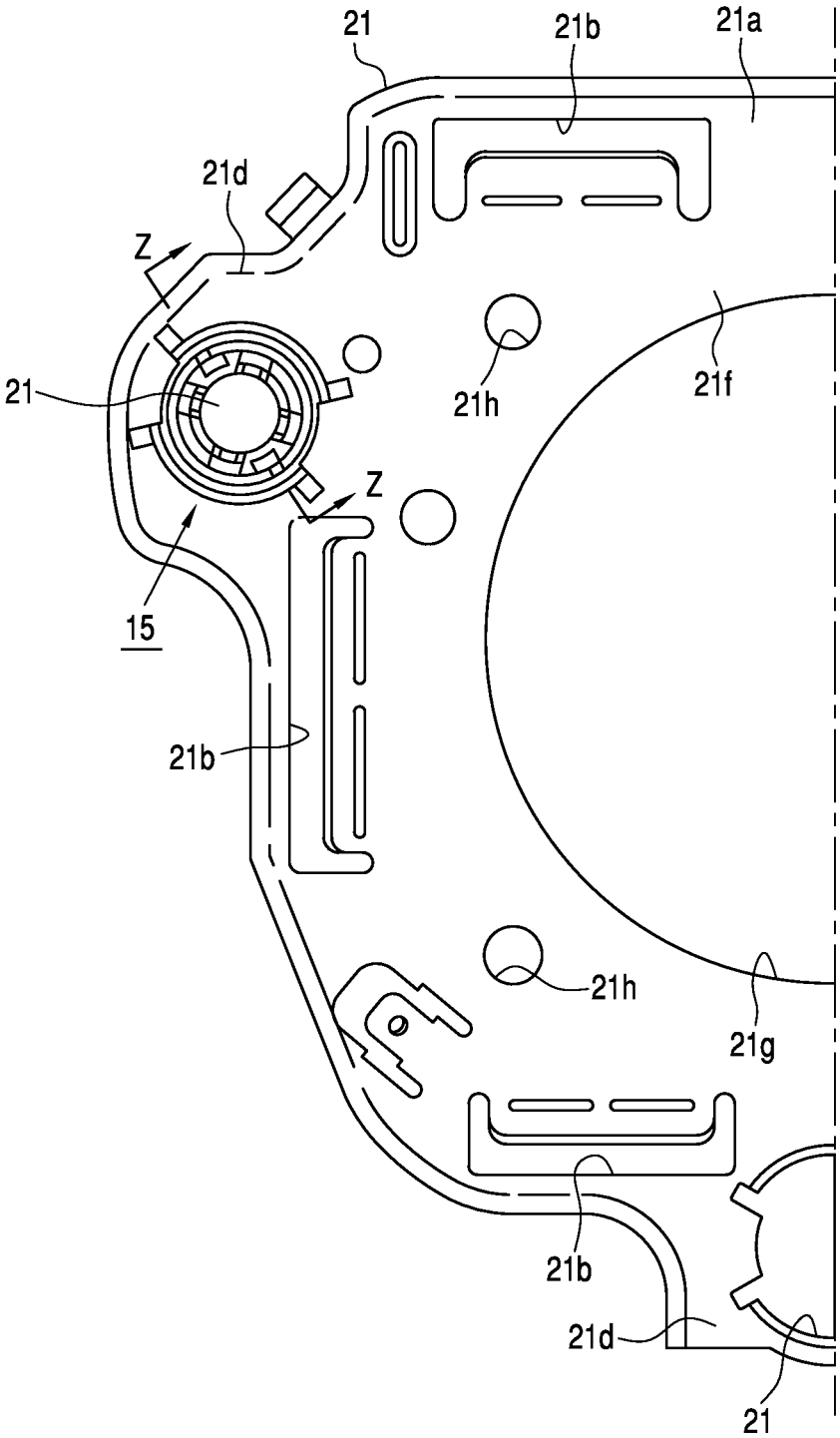
FIG. 7 is a partial back view showing a state in which the horn switch mechanism is assembled in the one of the mounting holes in the back holder.

As shown FIG. 5B and FIGS. 8 and 11, the resin member 41 is formed integral of a synthetic resin which is an insulation material in whole. Part of this resin member 41 is made up of an annular ring-like portion 41b having an insertion hole 41a which is slightly larger in diameter than the fixing pin 31. An outside diameter of the ring-like portion 41b is set almost similar to an outside diameter of the coil spring 35 and an outside diameter at a rear end portion of the inner wall surface of the through hole 12c (a maximum diameter of the opening defined by the tapered inner wall surface).

Locking pieces 41c extend forwards from a plurality of locations (four locations) which lie near the insertion hole 41a in the front surface of the ring-like portion 41b and along a circumferential direction of the insertion hole 41a. A claw portion 41d is provided at a front end portion of each locking piece 41c so as to project radially inwards, and these claw portions 41d enter the interior of the locking groove 31b of the fixing pin 31. External surfaces of the locking pieces 41c make up part of a cylindrical surface which has the same diameter at any locations in the front-rear direction. Namely, the external surfaces of the locking pieces 41c do not correspond to the tapered inner wall surface of the through hole 12c, and therefore, the external surfaces are not brought into surface contact with the inner wall surface.

Additionally, a plurality of (four) engaging pieces 41e extend forwards from positions on a front surface of the ring-like portion 41b which lie along the circumference of the insertion hole 41a and between the adjacent locking pieces 41c. External surfaces of the engaging pieces 41e make up part of a tapered surface which expands diametrically as it extends to the rear.

A pair of mounting portions 41g extend rearwards from the ring-like portion 41b. Each mounting portion 41g is formed to be curved so as to be protuberant radially outwards of the resin member 41 corresponding to an external shape of the fixing pin 31.

Then, the resin member 41 is made up of the ring-like portion 41b, the locking pieces 41c, the engaging pieces 41e and both the mounting portions 41g.

This resin member 41 is fitted on an external side of the fixing pin 31 at the ring-like portion 41b and both the mounting portions 41g and is mounted on the fixing pin 31 so as not to come off the fixing pin 31 by the claw portions 41d entering the locking groove 31b. Thus, as has been described above, in the resin member 41, the external surfaces of the four engaging pieces 41e surround intermittently (in a discontinuous fashion) an axis which passes through the center of the ring-like portion 41b while holding the external surfaces of the locking pieces 41c therebetween in an alternate fashion. By adopting this configuration, the resin member 41 has the external surface which is something like a tapered external surface which expands diametrically as it extends to the rear.

As shown in FIG. 5A and FIG. 12, the coil spring 35 is wound around the fixing pin 31 except for the collar portion 31a. The coil spring 35 is disposed between a step portion 32f formed to the cylindrical portion 32a of the movable mount member 32 and the ring-like portion 41b of the resin member 41 so as to be compressed therebetween. In this state, the ring-like portion 41b receives a forward biasing force of the compressed coil spring 35.

In this way, the plurality of single components (the fixing pin 31, the movable mount member 32, the cap member 33, the contact terminal 34, the coil spring 35 and the resin member 41) are unitized so as to make up the horn switch mechanism 15 which is an assembly. Because of this, when mounting or replacing the horn switch mechanism 15, the unitized horn switch mechanism 15 can be handled as one assembly.

<Elastic Member 42>

As shown in FIGS. 8 and 9, the elastic member 42 is, as has been described above, such as to make up part of the damping system for the steering wheel 10 and is interposed between the movable mount member 32 of the horn switch mechanism 15 and the mounting hole 21e in the back holder 21 of the airbag device 20. The elastic member 42 is formed of an elastic material such as rubber or elastomer in whole. An engaging portion 42a which is made up of an annular recess portion which is opened at a front surface thereof is provided on the elastic member 42. The engaging portion 42a is formed at a location (a rear location) which corresponds to the engaged portion 21j of the back holder 21. The engaged portion 21j is fitted in this engaging portion 42a from the front side. *A portion of the elastic member 42 is disposed between the slider 32 and the engaged portion 21j and the mounting portion 21d of the back holder. A portion of a front surface 42f of the elastic member abuts a rear surface of the mounting portion 21d. A front end 42g of the elastic member extends forward of the rear surface of the mounting portion 21d.*

Further, as shown in FIG. 5A and FIG. 10, the elastic member 42 has an insertion hole 42b which is slightly large in diameter than the cylindrical portion 32a of the movable mount member 32 and is formed into a substantially annular shape. Stepped portions 42e are formed on an outer circumferential portion of the elastic member 42 at two locations which face each other in a diametric direction.

Then, as shown in FIG. 11, in such a state that the fitting portion 32b is in abutment with a rear surface of the elastic member 42, part of a front end portion of the side wall portion 33b of each cap member 33 is in abutment with a rear surface of the elastic member 42. In this way, the elastic member 42 is sandwiched from front and rear by the engaged portion 21j of each mounting holes 21e in the hack holder 21 and the side wall portion 33b of each cap member 33. In addition, in this state, as shown in FIG. 8, the connecting portions 34d of each contact terminal 34 are brought into abutment with the rear surface of the elastic member 42, and the second side portions 34c are brought into abutment with an outer circumferential surface of the elastic member 42.

Further, as shown in FIG. 11, the plurality of locking portions 32e are inserted through the through hole 42b, and front end portions of the locking portions 32e are locked on the front surface of the elastic member 42 from a radially inward direction. In addition to this, as shown in FIG. 10, the two hook portions 33c of the cap member 33 are locked on the corresponding stepped portions 42e of the elastic member 42 from a radially outward direction of the elastic member. By the locking portions 32e and the hook portions 33c being locked in the way described above, the elastic member 42 is mounted so as not to move in the front-rear direction relative to the movable mount member 32 and the cap member 33.

As shown in FIG. 9, an annular groove portion 42c is formed in the elastic member 42 which is opened at a front surface thereof. Similarly, an annular groove portion 42d is formed in the elastic member 42 which is opened at a rear surface thereof. The groove portion 42c is situated between the insertion hole 42b (the movable mount member 32) and the engaging portion 42a in the elastic member 42. The groove portion 42d is situated at a portion which lies at the rear of the groove portion 42c in the elastic member 42.

The elastic member 42 is such as to make up the dynamic damper together with the airbag device 20 that has been described before. In this embodiment, the elastic member 42 is caused to function as a spring of the dynamic damper 42, and the airbag device 20 is caused to function as a damper mass.

Here, by tuning the size, radial thickness and front-rear length of the elastic member 42, the resonance frequency of the dynamic damper in the vertical and horizontal directions is set to a designed vibration control frequency (a frequency with which vibrations are desired to be controlled) with respect to vertical and horizontal vibrations of the steering wheel 10.

Thus, the damping system for steering wheel of the embodiment is configured as has been described heretofore. Next, the function of the embodiment will be described, while focusing on the function of the damping system.

Firstly, the mounting work will be described in which each horn switching mechanism 15 is mounted on the back holder 21 of the airbag device 20 via the elastic member 42. As this work, work of mounting each horn switch mechanism 15 on the elastic member 42 and work of mounting the elastic member 42 in the mounting hole 21e are performed.

As to the former work, as shown in FIG. 9, the horn switch mechanism 15 is disposed at the rear (on the left in FIG. 9) of the elastic member 42 so that the side wall portion 33b of the cap member 33 extends to the front. By so disposing, the side wall portion 33b is caused to face the rear surface of the elastic member 42. In this state, the horn switch mechanism 15 is inserted in the insertion hole 42b in the elastic member 42 at the movable mount member 32. As the horn switch mechanism 15 is inserted in this way, the side wall portion 33b of the cap member 33 approaches the elastic member 42 from the rear. The second side portions 34c of the contact terminal 34 slide on the outer circumferential surface of the elastic member 42. As shown in FIG. 11, when the movable mount member 32 is inserted to a position where the fitting portion 32b is brought into abutment with the rear surface of the elastic member 42, part of the front end portion of the side wall portion 33b is brought into abutment with the rear surface of the elastic member 42. Additionally, as shown in FIG. 8, the connecting portions 34d of the contact terminal 34 is brought into abutment with the rear surface of the elastic member 42, and both the second side portions 34c are brought into abutment with a rear surface of the back holder 21. By this abutment, the back holder 21 and the contact terminal 34 are put into an electrically communicating state.

Further, as shown in FIG. 11, as the movable mount member 32 is inserted through the insertion hole 42b, the plurality of locking portions 32e are inserted into the insertion hole 42b while being deflected radially inwards. When front end portions of the locking portions 32e pass through the insertion hole 42b during this insertion of the locking portions 32e, the locking portions 32e are locked on the front surface of the elastic member 42 from the radially inward direction by virtue of their own elastic restoring force, in addition to this, as shown in FIG. 10, the two hook portions 33c of the cap member 33 are locked on the corresponding stepped portions 42e of the elastic member 42 from the radially outward direction of the elastic member 42. By the locking portions 32e and the hook portions 33c being locked in the ways described above, the elastic member 42 is mounted on the movable mount member 32 so as not to move in the front-rear direction with respect to the movable mount member 32 and the cap member 33.

When performing the latter work, as shown in FIG. 9, the elastic member 42 is disposed at the rear of the mounting hole 21e in the back holder 21 so that the engaging portion 42a is oriented to the front. By the elastic member 42 being so disposed, the engaging portion 42a of the elastic member 42 is caused to face the engaged portion 21j at the circumferential edge portion of the mounting hole 21e. When the elastic member 42 is caused to approach the mounting hole 21e in this state, the engaged portion 21j is fitted into the engaging portion 42a from the front side as shown in FIG. 8.

In this way, the elastic member 42 is sandwiched from front and rear by the engaged portion 21j of the back holder 21 and the side wall portion 33b of the cap member 33.

In such a state that the horn switch mechanisms 15 are mounted individually on the back holder 21 in the way described above, the movement of the elastic member 42 in the direction along the axis L1 of the steering shaft 14 (in the front-rear direction) is restricted by the engaged portion 21j and the side wall portion 33b. Additionally, the movement of the elastic member 42 in the direction perpendicular to the axis L1 of the steering shaft 14 is restricted by the engaged portion 21j which is fitted in the engaging portion 42a.

In such a state that the horn switch mechanisms 15 are mounted on the back holder 21 in the way described above, the collar portion 31a of the fixing pin 31 is situated further rearwards than the back holder 21. This collar portion 31a receives a rearward biasing force from the coil spring 35.

In addition, in such a state that the horn switch mechanisms 15 are mounted on the back holder 21 in the way described above, the movable mount member 32 is interposed between the fixing pin 31 and the back holder 21 and supports the back holder 21 so as to move in the front-rear direction relative to the fixing pin 31 while preventing the contact of the fixing pin 31 with the back holder 21, that is, ensuring the insulation state therebetween, transmitting the rearward biasing force of the coil spring 35 to the collar portion 31a of the fixing pin 31.

Additionally, in such a state that the horn switch mechanisms 15 are mounted on the back holder 21 in the way described above, the top plate portion 33a of the cap member 33 is brought into abutment with the switch supporting portions 24g of the pad portion 24 that has been described before (refer to FIG. 3). Thus, the dislocation of the cap member 33 from the movable mount member 32 is restricted by this abutment. For example, even the dislocation of the cap member 33 from the movable mount member 32 is restricted that would otherwise be caused by a reaction force produced when the airbag device 20 is struck strongly.

Further, in such a state that the horn switch mechanisms 15 are mounted on the back holder 21 in the way described above, the coil springs 35 of the horn switch mechanisms 15 and the fixing pins 31 which are inserted through the coil springs 35 project to the front (in the direction in which they move away from the pad portion 24) from the back holder 21.

Next, the mounting work of mounting the airbag device 20 on the metallic core frame 12 via the plurality of (three) horn switch mechanisms 15 will be described.

When performing this work, as shown in FIG. 13, each fixing pin 31 is caused to approach the through hole 12c in each holding portion 12b of the metallic core frame 12 from the rear. As this occurs, a portion of each fixing pin 31 which lies further forwards than the locking groove 31b (hereinafter, referred to as a "front end 31c") project slightly to the front from the coil spring 35 and the resin member 41.

The resin member 41 has already been mounted on the fixing pin 31 before the fixing pin 31 is inserted through the through hole 12c, and therefore, the resin member 41 is also inserted into the through hole 12c when the fixing pin 31 is inserted through the through hole 12c.

As the resin member 41 is inserted into the through hole 12c, the ring-like portion 41b of the resin member 41 approaches the holding portion 12b, and the engaging pieces 41e approach the inner wall surface of the through hole 12c. Additionally, the front end 31c of the fixing pin 31 comes into contact with the clip 13. Further, when the fixing pin 31 is inserted through the through hole 12c against the biasing force of the clip 13, the clip 13 is elastically deformed in a radially outward direction of the fixing pin 31. Then, as shown in FIG. 12, when the fixing pin 31 is inserted to a location (a front-rear position) where the locking groove 31b corresponds to the clip 13, the clip 13 attempts to enter the locking groove 31b by virtue of its own elastic restoring force.

On the other hand, the claw portions 41d of the resin member 41 which is biased to the front by the coil spring 35 has entered the interior of the locking groove 31b. Because of this, when the clip 13 enters the interior of the locking groove 31b, the clip 13 forces itself between the claw portions 41d and a front wall surface 31d of the locking groove 31b while compressing the coil spring 35 to the rear. By the clip 13 so entering the locking groove 31b, the claw portions 41d are situated at the rear of the clip 13 within the locking groove 31b. In the clip 13, a portion which is situated at the front of the through hole 12c is sandwiched from front and rear by the claw portions 41d which are biased to the front by the coil spring 35 and the front wall surface 31d of the locking groove 31b, whereby the movement of the clip 13 is restricted. On the other hand, the fixing pin 31 is restricted from moving in the front-rear direction by the clip 13 that has entered the locking groove 31b. In this way, by the fixing pin 31 being locked on the metallic core frame 12 by the clip 13, the fastening of each horn switch mechanism 15 to the metallic core frame 12 and the mounting of the airbag device 20 on the metallic core frame 12 can be executed. This locking structure of locking the elements on the metallic core flame 12 by virtue of the elasticity of the clip 13 which is produced in association with the insertion of the fixing pin 31 through the through hole 12c is also referred to as a snap-in fitting structure.

In this assembled state, respective external surfaces of the engaging pieces 41e are brought into contact with the inner wall surface of the through hole 12c. Additionally, the claw portions 41d are slightly spaced away to the front from a rear wall surface 31e of the locking groove 31b. In this way, the resin member 41 is interposed between the inner wall surface of the through hole 12c in the metallic core frame 12 (the holding portion 12b) and the fixing pin 31.

Additionally, in the assembled state, the fixing pin 31 for each horn switch mechanism 15 which is locked on the metallic core frame 12 supports the airbag device 20 (the back holder 21) via the movable mount member 32 so that the airbag device 20 can move back and forth (that is, the airbag device 20 moves towards and away from the metallic core frame 12).

Here, the coil spring 35 which is interposed between a step portion 32f of the movable mount member 32 and the ring-like portion 41b of the resin member 41 has already been compressed before it is mounted on the metallic core frame 12. This coil spring 35 which is so compressed biases the move mount member 32 to the rear which is the direction in which the movable mount member 32 moves away from the metallic core member 12, whereby the contact terminal 34 is spaced away to the rear from the collar portion 31a of the fixing pin 31.

By being compressed further, the coil spring 35 permits the airbag device 20 to move towards the side of the metallic core frame 12. Namely, the coil spring 35 is compressed with a horn stroke ensured. The horn stroke means a traveling amount of the airbag device 20 towards the metallic core frame 12 which is necessary to move the contact terminal 34 from a state in which the contact terminal 34 is spaced away from the collar portion 31a of the fixing pin 31 (an off state of the horn switch mechanism 15: FIG. 12) to a state in which the contact terminal 34 comes into contact with the collar portion 31a (an on state of the horn switch mechanism 15: FIG. 14). Additionally, a load with which the driver presses against the airbag device 20 to put the horn switch mechanism 15 in the on state is determined by the coil spring 35.

Incidentally, in the steering wheel 10, when in a normal state in which the airbag device 20 is not pressed to the front or no excessive load is applied to the airbag device, as shown in FIG. 12, the contact terminal 34 moves away to the rear from the fixed side contact portion (the collar portion 31a of the fixing pin 31). Then, the electrically communicating state ensured between the contact terminal 34 and the fixing pin 31 is released, whereby the horn unit 40 is kept inoperative. As this occurs, the rearward biasing force of the coil spring 35 is applied to the collar portion 31a of the fixing pin 31 which is locked on the metallic core frame 12 by the clip 13 via the movable mount member 32.

Additionally, as this occurs, the forward biasing force of the coil spring 35 is applied to the resin member through the ring-like portion 41b, and the claw portions 41d of the resin member 41 which enter the interior of the locking groove 31b of the fixing pin 31 presses the clip 13 in the locking groove 31b to the front. By the clip 13 being so pressed, the clip 13 is sandwiched from front and rear by the front wall surface 31d of the locking groove 31b and the claw portions 41d.

In contrast with this, when the airbag device 20 is pressed to the front or the excessive load is applied to the airbag device 20, whereby the back holder 21 is moved to the front against the coil spring 35, the movable mount member 32 of at least one horn switch mechanism 15 is pressed via the back holder 21 against the biasing force of the coil spring 35 to thereby move to the side of the metallic core frame 12 (to the front side). The cap member 33 and the contact terminal 34 also move to the side of the metallic core frame 12 (to the front side) together with the back holder 21 and the movable mount member 32. As the situation in which the excessive load is applied, for example, a situation is considered in which the vehicle is being driven on a rough road, vibrating the airbag device 20 largely.

Then, as shown in FIG. 14, when at least one of the three projecting contact portions 34e is brought into contact with the collar portion 31a of the fixing pin 31, an electric communication is established between the metallic core frame 12 which is connected the ground GND (earthed to a vehicle body) and the back holder 21 via the clip 13, the fixing pin 31 and the contact terminal 34. By establishing the electric communication in this way, the horn switch mechanism 15 is closed, and the horn unit 40 which is electrically connected to the back holder 21 is activated (sounds for a warning).

In this way, in addition to the function as the fixed side contact portion, the fixing pin 31 exhibits not only the function to be locked on the metallic core frame 12 (the holding portion 12b) but also the function to support the back holder 21 so as to move in the front-rear direction relative to the metallic core frame 12.

In addition, when the back holder 21 is moved to the front in the way described above, the rearward biasing force of the coil spring 35 which has been applied to the collar portion 31a of the fixing pin 31 via the movable mount member 32 (the back holder 21) until then is lost. Because of this, the fixing pin 31 is allowed to swing on the portion where it is locked on the metallic core frame 12 by the clip 13 as a fulcrum. As this occurs, the rearward biasing force that has been applied to the clip 13 through the front wail surface 31d in the locking groove 31b until then is released, whereby the clip 13 is allowed to move within the locking groove 31b.

On the other hand, in the airbag device 20, when in a normal state in which a front impact that is produced when the vehicle is involved in a frontal collision is not applied to the vehicle, no gas is injected from the gas injection portion 23x of the inflator 23, whereby the airbag is kept in the folded state.

Even when in the normal state, there is a situation in which vertical and horizontal vibrations are applied to the steering wheel 10 while the vehicle is being driven at high speeds or the engine is idling. These vibrations are transmitted to the airbag device 20 by way of the metallic core frame 12, the horn switch mechanisms 15 and the elastic members 42.

In response to the vibrations the airbag device 20 functions as the damper mass of the dynamic damper and the elastic members 42 function as the springs of the dynamic damper.

For example, when the steering wheel 10 vibrates vertically with a predetermined frequency, the elastic members 42 vibrate vertically together with the airbag device 20 with a resonant frequency which is the same or close to the predetermined frequency while being elastically deformed (resonates), so as to absorb the vertical vibration energy of the steering wheel 10. By absorbing the vibration energy in the way described above, the vertical vibration of the steering wheel 10 is suppressed (controlled).

Additionally, when the steering wheel 10 vibrates horizontally with a predetermined frequency, the elastic members 42 vibrate horizontally together with the airbag device 20 with a resonant frequency which is the same or close to the predetermined frequency while being elastically deformed, so as to absorb the horizontal vibration energy of the steering wheel 10. By absorbing the vibration energy in the way described above, the horizontal vibration of the steering wheel 10 is suppressed (controlled).

In this way, according to the embodiment, the vibrations in either of the vertical and horizontal directions that are applied to the steering wheel 10 are dampened (controlled).

The groove portion 42c formed on the front surface and the groove portion 42d formed on the rear surface of the elastic member 42 facilitate the elastic deformation of the elastic member 42. Because of this, when the steering wheel 10 vibrates, the elastic member 42 tends to resonate easily together with the airbag device 20.

Here, when the steering wheel 10 vibrates, it is considered that it is the portion between the engaging portion 42a and the movable mount member 32 (the insertion hole 42b) that is mainly elastically deformed in the annular elastic member 42.

Because of this, in this embodiment in which the groove portions 42c, 42d are formed between the engaging portion 42a and the movable mount member 32 (the insertion hole 42b), the portion in relation to the elastic deformation tends to be deformed elastically more easily.

When impact is applied to the vehicle from the front as a result of a frontal collision, the driver tends to be inclined to the front by virtue of inertia. On the other hand, in the airbag device 20, when the inflator 23 is activated in response to the impact, the inflation gas is injected from the gas injection portion 23x. When this inflation gas is supplied to the airbag, the airbag is deployed to be inflated. As the pressure applied to the skin portion 24a of the pad portion 24 continues to increase due to the deployment and inflation of the airbag, the skin portion 24a is ruptured at the thin portion 24c. Then, the airbag continues to be deployed and inflated towards the rear through an opening generated by the rapture. The airbag deployed and inflated is present in front of the driver who is falling to the front by the impact produced by the frontal collision, the driver who is falling to the front is restrained, whereby the driver is protected from failing to the front.

(1) According to the embodiment that has been described in detail heretofore, the following advantages can be provided.

The side wall portion 33b of the cap member 33 in each horn switch mechanism 15 is made use of as the extended portion which is extended to the front. The engaged portion 21j which extends to the rear is formed on the circumferential edge portion of the mounting hole 21e of the back holder 21. The engaging portion 42a is provided on the elastic member 42 which is made up of the recess portion which is opened at the front surface of the elastic member 42. Then, the elastic member 42 is made to be sandwiched from front and rear by the engaged portion 21j which is fitted in the engaging portion 42a and the side wall portion 33b (FIG. 14).

Because of this, by performing the simple work of inserting the movable mount member 32 through the elastic member 42 and fitting the fitted portion 21j in the engaging portion 42a, the elastic member 42 can be mounted easily on the movable mount member 32 and the back holder 21 in such a state that the elastic member 42 is restricted from moving in the direction which follows the steering shaft 14 and from moving in the direction perpendicular to the steering shaft 14. As a result, the airbag device 20 and the elastic members 42 can be made to vibrate as designed while facilitating the mounting work of the elastic members 42, thereby making it possible to exhibit the vibration control effect.

(2) The groove portions 42c, 42d are formed on the front surface and the rear surface of the elastic member 42, respectively (FIG. 9).

Because of this, the elastic deformation of the elastic member 42 can be facilitated by these groove portions 42c, 42d, thereby making it possible to obtain the suppressing (controlling) effect of the vibrations of the steering wheel 10 to a further extent.

(3) The groove portions 42c, 42d are formed between the engaging portion 42a and the movable mount member 32 (the insertion hole 42b) (FIG. 9).

Because of this, the portion of the elastic member 42 which is involved in the elastic deformation thereof can be deformed elastically further, the effect obtained under (2) above can be obtained more easily.

(4) In Patent Document 1 described before, it is considered that in order to mount the elastic members in the mounting holes in the hard back holder (bracket), the back holder (bracket) is disposed inside a mold as an insert so as to mold elastic members of a resin around the mounting holes. As this occurs, however, the back holder (bracket) which is disposed inside the mold occupies a wide space, and hence, the number of elastic members that can be molded at one time is decreased, calling for an increase in cost.

In this regard, in the embodiment, after the elastic member 42 is formed, the engaged portion 21j of the back holder 21 is fitted in the engaging portion 42a (FIGS. 8, 9). Because of this, in molding elastic members 42 of a resin, the back holder 21 does not have to be disposed inside a mold as an insert. No insert (back holder 21) is necessary when molding elastic members 42, and a large number of elastic members 42 can be molded at one time accordingly, thereby making it possible to realize a reduction in cost.

It should be noted that the invention can be embodied into a different embodiment which will be described below.

<As to Engaged Portion 21j>

An engaged portion 21j only has to extend to the rear from a circumferential edge portion of a mounting hole 21e in a back holder 21. Therefore, as has been described in the embodiment above, the engaged portion 21j may be formed integrally with the back holder 21 or may be formed separately from the back holder 21.

There may be provided an annular engaged portion 21j or an arc-like engaged portion 21j. In the former case, the number of engaged portions 21j is one, but in the latter case, the number of engaged portions 21j may be one or more.

<As to Elastic Member 42>

An engaging portion 42a of an elastic member 42 only has to be made up of a recess portion which is opened at the front face of the elastic member 42 and only has to be at least such as to enable the engaged portion 21j to be fitted therein. Thus, the shape and size of the engaging portion 42a may be altered as long as the conditions above are met.

One of groove portions 42c, 42d may be omitted. Namely, the groove portion may be provided only on one of a front surface and a rear surface of the elastic member 42.

At least one of the groove portions 42c, 42d may be provided at a plurality of locations on the elastic member 42.

<As to Extended Portion>

A member which is different from the sick wall portion 33b of the cap member 33 may be used as an extended portion which is extended to the front on a horn switch mechanism 15. For example, an extended portion may be provided on a cap member 33 separately from a side wall portion 33b. Also, the extended portion may be provided separately from the cap member 33.

<As to Support Member>

In place of the fixing pin 31, a replacement member which satisfies the following conditions may be used as a support member.

Condition 1: The replacement member should be inserted through the through hole 12c to thereby be locked on the metallic core frame 12 by the elastic member (the clip 13).

Condition 2: By being inserted through the back holder 21, the replacement member should support the back holder 21 so as to move in the front-rear direction relative to the metallic core frame 12.

Condition 3: The replacement member should have the pressure bearing portion (the collar portion 31a) which bears the rearward biasing force by the biasing member (the coil spring 35) in a position on a rear side of the back holder 21.

Condition 4: The replacement member should be formed of a metal having conductivity, and the rear end face (the collar portion 31a) thereof functions as the fixed side contact portion.

<Others>

The damping system of the invention can be applied to steering wheels of steering systems of vehicles such as aircraft and ships, in addition to the motor vehicles as described above. In this case, the motor vehicles are not limited to private vehicles, but may be various types of industrial vehicles.

What is claimed is:

1. A damping system for *a* steering wheel, comprising:

a fixed member fixed to a steering shaft extending in a front-rear direction;

an airbag device which comprises a back holder provided at a front portion thereof and which is disposed on a rear side of the fixed member;

an elastic member mounted in a mounting hole formed in the back holder so as to penetrate therethrough in a front-to-rear direction; and a horn switch mechanism comprising:

a support member supported on the fixed member at a position on a front side of the back holder; and a slider disposed between the support member and the elastic member so as to activate a horn unit by a forward movement of the slider associated with a pressing operation of the airbag device, wherein said damping system allows the airbag device to function as a damper mass of a dynamic damper, and allows the elastic member to function as a spring of the dynamic damper, wherein the horn switch mechanism further comprises an extended portion extending forwards, wherein the back holder comprises an engaged portion extending rearwards and formed at a circumferential edge portion of the mounting hole, wherein the elastic member comprises an engaging portion comprising a recess portion opened in a front surface of the elastic member, wherein the elastic member is sandwiched by the engaged portion fitted in the engaging portion and the extended portion in the front-rear direction, and wherein the elastic member is formed, as a whole, of an elastic materiel of rubber or elastomer.

2. The damping system for *a* steering wheel according to claim 1, wherein the elastic member comprises a groove portion which is opened in [at least] one of the front surface and a rear surface of the elastic member.

3. The damping system for *a* steering wheel according to claim 2, wherein the groove portion is formed between the engaging portion and the slider.

*4. A damping system for a steering wheel comprising:*

*an airbag device that includes a pad portion having a surface and a back holder forming a bag accommodation space between the pad portion and the back holder;*

*a plurality of pins each having a front end portion, a rear end portion, a shaft portion extending in a front-rear direction, and a collar portion provided at the rear end portion, wherein a diameter of the collar portion is set to be larger than a diameter of the shaft portion;*

*a plurality of elastic members, each of which is formed, as a whole, of an elastic material of rubber or elastomer and is located between the back holder and an outer periphery of a corresponding one of the pins;*

*a plurality of sliders, each of which moves forward associated with a pressing operation of the airbag device and is located between the outer periphery of a corresponding one of the pins and the corresponding elastic member; and*

*a plurality of biasing members, each of which applies a biasing force to urge the airbag device away from the steering wheel and is located around the outer periphery of a corresponding one of the pins, wherein*

*each pin is mounted on the steering wheel at the front end portion using a snap-in fitting structure and supports the airbag device at the rear end portion,*

*each pin includes a locking groove formed at the front end portion,*

*the steering wheel includes a plurality of through holes, each of which passes through the steering wheel in the front-rear direction,*

*a plurality of clips are held on the steering wheel corresponding to the through holes,*

*the snap-in fitting structure includes the locking groove of each pin and one of the clips that is engaged with the locking groove,*

*the back holder includes a plurality of mounting portions and a plurality of mounting holes, wherein each mounting hole passes through a corresponding one of the mounting portions in the front-rear direction,*

*the shaft portion of each pin and the corresponding slider are inserted into a corresponding one of the mounting holes,*

*the back holder includes a plurality of engaged portions, each of the engaged portions extends rearward from a circumferential edge portion of a corresponding one of the mounting holes,*

*each elastic member contacts a corresponding one of the sliders and a corresponding one of the engaged portions and suppresses vibrations transmitted between the back holder and the corresponding pin,*

*the damping system allows the airbag device to function as a damper mass of a dynamic damper and allows the elastic members to function as a spring of the dynamic damper, and*

*each elastic member includes a portion, which is disposed between the corresponding slider and the corresponding engaged portion and contacts the engaged portion, and an inner surface of an insertion hole contacting the corresponding slider, wherein the portion of the elastic member extends in a radial direction of the corresponding mounting hole, and is located rearward of the corresponding mounting portion.*

*5. The damping system for a steering wheel according to claim 4, wherein a resin member is located between the front end portion of each pin and an inner periphery of a corresponding one of the through holes.*

*6. The damping system for a steering wheel according to claim 5, wherein*

*the steering wheel has a frame portion that includes a fixed member,*

*the through holes are provided in the fixed member, and each pin is directly mounted on the fixed member using the snap-in fitting structure.*

*7. The damping system for a steering wheel according to claim 4, wherein the engaged portions are integrally formed with the back holder.*

*8. The damping system for a steering wheel according to claim 4, wherein*

*each elastic member includes a front surface, a rear surface, a front groove portion that is opened in the front surface, and a rear groove portion that is opened in the rear surface, and*

*the portion of each elastic member includes a part of the elastic member between a bottom surface of the front groove portion and a bottom surface of the rear groove portion.*

*9. The damping system for a steering wheel according to claim 4, wherein a front surface is provided on the elastic member, and a part of the front surface abuts the corresponding mounting portion which is spaced apart from the corresponding slider by the elastic member.*

*10. A damping system for a steering wheel comprising:*

*an airbag device that includes a pad portion having a surface and a back holder forming a bag accommodation space between the pad portion and the back holder;*

*a plurality of pins each having a front end portion, a rear end portion, a shaft portion extending in a front-rear direction, and a collar portion provided at the rear end portion, wherein a diameter of the collar portion is set to be larger than a diameter of the shaft portion;*

*a plurality of elastic members, each of which is formed, as a whole, of an elastic material of rubber or elastomer and is located between the back holder and an outer periphery of a corresponding one of the pins;*

*a plurality of sliders, each of which moves forward associated with a pressing operation of the airbag device and is located between the outer periphery of a corresponding one of the pins and the corresponding elastic member; and*

*a plurality of biasing members, each of which applies a biasing force to urge the airbag device away from the steering wheel and is located around the outer periphery of a corresponding one of the pins, wherein*

*each pin is mounted on the steering wheel at the front end portion using a snap-in fitting structure and supports the airbag device at the rear end portion,*

*each pin includes a locking groove formed at the front end portion,*

*the steering wheel includes a plurality of through holes, each of which passes through the steering wheel in the front-rear direction,*

*a plurality of clips are held on the steering wheel corresponding to the through holes,*

*the snap-in fitting structure includes the locking groove of each pin and one of the clips that is engaged with the locking groove,*

*the back holder includes a plurality of mounting portions and a plurality of mounting holes, wherein each mounting hole passes through a corresponding one of the mounting portions in the front-rear direction,*

*the shaft portion of each pin and the corresponding slider are inserted into a corresponding one of the mounting holes,*

*the back holder includes a plurality of engaged portions, each of which extends rearward from a circumferential edge portion of a corresponding one of the mounting holes,*

*each elastic member contacts a corresponding one of the sliders and a corresponding one of the engaged portions and suppresses vibrations transmitted between the back holder and the corresponding pin,*

*the damping system allows the airbag device to function as a damper mass of a dynamic damper and allows the elastic members to function as a spring of the dynamic damper, and*

*each elastic member includes a portion, which is disposed between the corresponding slider and the corresponding engaged portion and contacts the engaged portion, and an inner surface of an insertion hole contacting the corresponding slider, wherein*

*the portion of the elastic member extends in a radial direction of the corresponding mounting hole, and*

*the insertion hole extends forward of a rear surface of the corresponding mounting portion.*

*11. The damping system for a steering wheel according to claim 10, wherein the engaged portions are integrally formed with the back holder.*

*12. A damping system for a steering wheel comprising:*

*an airbag device that includes a pad portion having a surface and a back holder forming a bag accommodation space between the pad portion and the back holder;*

*a plurality of pins each having a front end portion, a rear end portion, a shaft portion extending in a front-rear direction, and a collar portion provided at the rear end portion, wherein a diameter of the collar portion is set to be larger than a diameter of the shaft portion;*

*a plurality of elastic members, each of which is formed, as a whole, of an elastic material of rubber or elastomer and is located between the back holder and an outer periphery of a corresponding one of the pins;*

*a plurality of sliders, each of which moves forward associated with a pressing operation of the airbag device and is located between the outer periphery of a corresponding one of the pins and the corresponding elastic member; and*

*a plurality of biasing members, each of which applies a biasing force to urge the airbag device away from the steering wheel and is located around the outer periphery of a corresponding one of the pins, wherein*

*each pin is mounted on the steering wheel at the front end portion using a snap-in fitting structure and supports the airbag device at the rear end portion,*

*each pin includes a locking groove formed at the front end portion,*

*the steering wheel includes a plurality of through holes, each of which passes through the steering wheel in the front-rear direction,*

*a plurality of clips are held on the steering wheel corresponding to the through holes,*

*the snap-in fitting structure includes the locking groove of each pin and one of the clips that is engaged with the locking groove,*

*the back holder includes a plurality of mounting portions and a plurality of mounting holes, wherein each mounting hole passes through a corresponding one of the mounting portions in the front-rear direction,*

*the shaft portion of each pin and the corresponding slider are inserted into a corresponding one of the mounting holes,*

*each elastic member is located on an outer side of a corresponding one of the sliders and suppresses vibrations transmitted between the back holder and the corresponding pin,*

*the damping system allows the airbag device to function as a damper mass of a dynamic damper and allows the elastic members to function as a spring of the dynamic damper, and*

*each elastic member includes a portion, which is disposed between the corresponding mounting portion and the corresponding slider in a radial direction of the corresponding mounting hole, and an inner surface of an insertion hole contacting the corresponding slider, wherein the portion of the elastic member extends in the radial direction and is located rearward of the corresponding mounting portion, wherein*

*a front surface is provided on the elastic member, and a part of the front surface abuts the corresponding mounting portion which is spaced apart from the corresponding slider by the elastic member.*

*13. The damping system for a steering wheel according to claim 12, wherein*

*each elastic member further includes a rear surface, a front groove portion that is opened in the front surface, and a rear groove portion that is opened in the rear surface, and*

*the portion of each elastic member includes a part of the elastic member between a bottom surface of the front groove portion and a bottom surface of the rear groove portion.*

* * * * *